June 25, 1968 J. P. HUNT 3,390,274
ROTATING LIGHT CONDUCTOR FOR INSTRUMENT READING
Filed Dec. 7, 1964 2 Sheets-Sheet 1
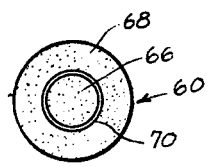
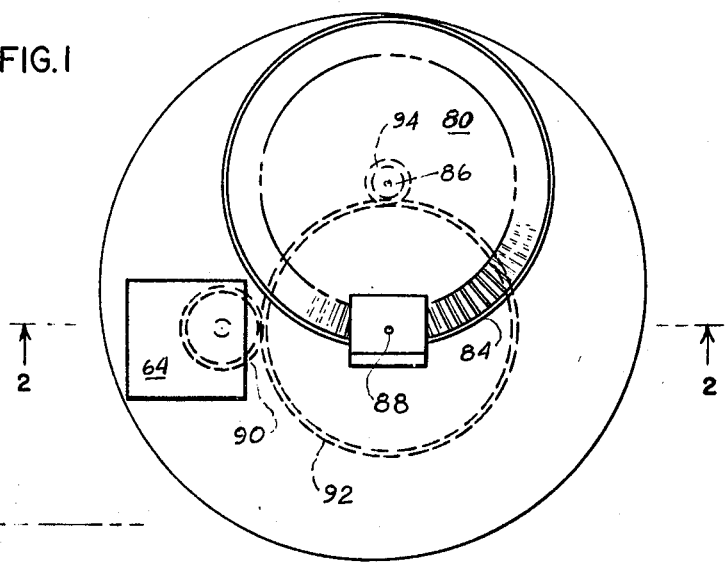
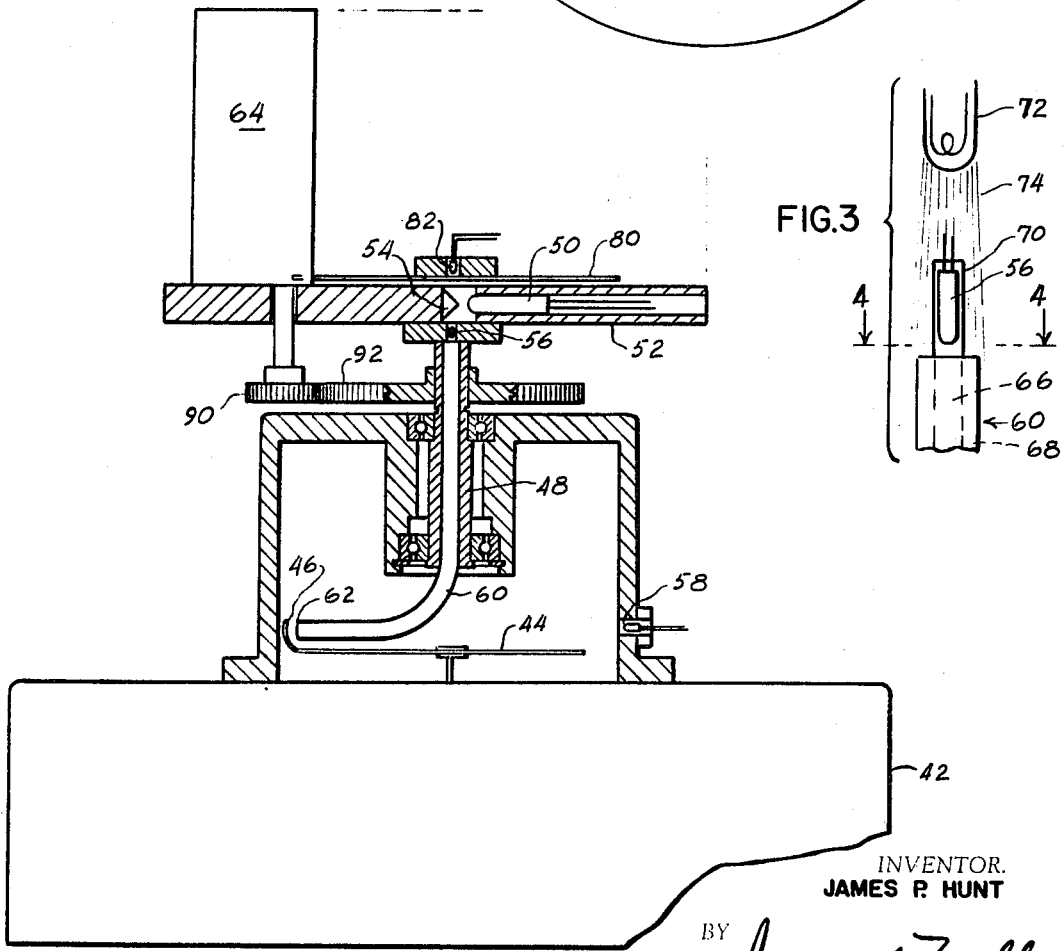
INVENTOR.
JAMES P. HUNT
BY *James and Franklin*
ATTORNEYS June 25, 1968  J. P. HUNT  3,390,274
ROTATING LIGHT CONDUCTOR FOR INSTRUMENT READING
Filed Dec. 7, 1964  2 Sheets-Sheet 2
FIG. 5
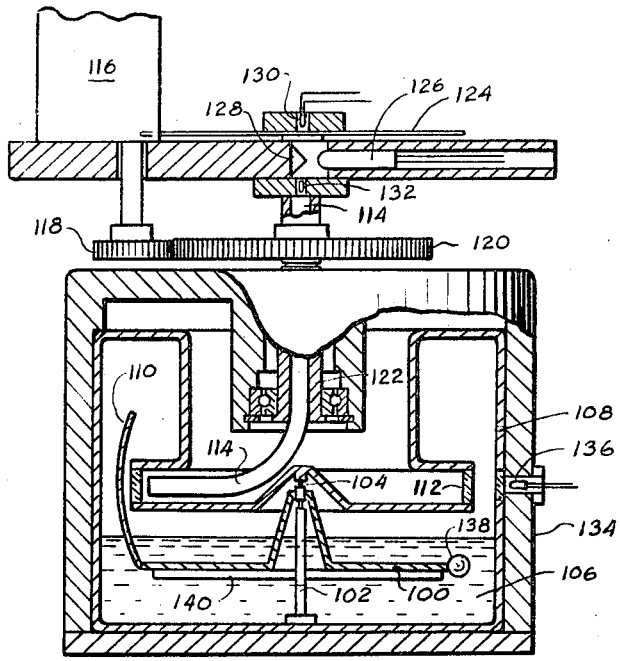
FIG. 6
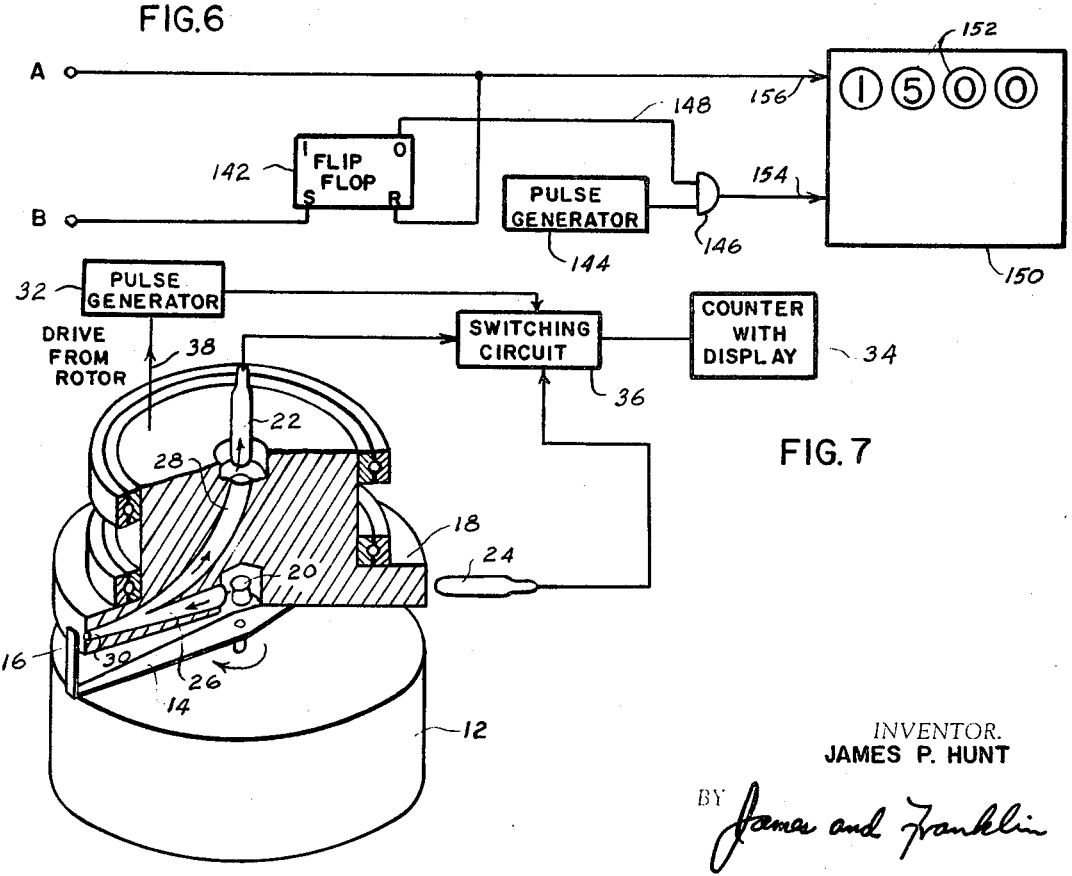
FIG. 7
INVENTOR.
JAMES P. HUNT
BY *James and Franklin*
ATTORNEYS

United States Patent Office 3,390,274
Patented June 25, 1968

3,390,274
ROTATING LIGHT CONDUCTOR FOR
INSTRUMENT READING
James P. Hunt, Maspeth, N.Y., assignor to White Avionics Corporation, New York, N.Y., a corporation of Delaware
Filed Dec. 7, 1964, Ser. No. 416,399
22 Claims. (Cl. 250—231)

This invention relates to instruments, and more particularly to an optical scanning transducer which reads the position of the pointer of a measuring instrument, and preferably transmits the reading digitally.

There are many situations in which it is desired to "pick off" the reading of an instrument, and to display or record the reading at a remote point. Such a pick-off device should not affect or add to the frictional load of the instrument itself. The general object of the present invention is to provide means for this purpose, which optically scans the reading or pointer position of the instrument. In accordance with more specific features and objects of the invention, the lamp and sensors of the optical system are stationary, which facilitates their mounting and wiring to external circuitry; and the scanning movement is applied to one or more fiber optic bundles which convey light to, and convey reflected light from, the instrument pointer, the latter acting as or being provided with a mirror.

There are important advantages in transmitting a reading by means of a digital or pulse count, and in accordance with a further object of the present invention the scanning system is used to control a switching device for a pulse generator, the pulses being transmitted during the scanning movement from a reference point to the position of the pointer, and thus constituting a measure of the instrument reading.

An ancillary object of the invention is to make the pulse count independent of possible variation in pulse rate, and for this purpose the pulse generator is driven by the same motive means which drives the scanner, so that a change in speed does not affect the numerical pulse count. The pulse generator preferably includes a light source and sensor, with an aperture disc therebetween, and in accordance with a feature and object of the invention, the same lamp that is used for the scanner serves also for the pulse generator.

To accomplish the foregoing objects, and other more specific objects which will hereinafter appear, my invention resides in the digital optical scanning elements, and their relation one to another, as are hereinafter more particularly described in the following specification. The specification is accompanied by drawings in which:

FIG. 1 is a plan view of a digital optical scanning transducer embodying features of my invention;

FIG. 2 is a partially sectioned elevation taken approximately on the line 2—2 of FIG. 1;

FIG. 3 is a fragmentary view drawn to enlarged scale and explanatory of a detail;

FIG. 4 is a section taken on the line 4—4 of FIG. 3;

FIG. 5 is a vertical section generally like that shown in FIG. 2, but showing the application of the invention to a compass;

FIG. 6 is a block diagram explanatory of the circuitry; and

FIG. 7 is a schematic partially sectioned view explanatory of a modification of the invention.

Referring to the drawing, and more particularly to FIG. 7, the instrument to be scanned is represented at 12, it having a pointer 14 with a mirror 16. This instrument may read pressure, temperature, compass heading, or other desired information. The present transducer comprises a rotor 18 which is coaxial with pointer 14. There is a light source 20, which for brevity is hereinafter referred to as a lamp, and a light sensor 22 which acts as a position sensor. Another light sensor 24 acts as a reference sensor, and may correspond to the zero or starting position of the pointer 14, or the heading of a vessel in the case of a compass, etc. The rotor has a means 26 to direct light from the lamp 20 to the mirror 16, and a means 28 to guide reflected light back from the mirror 16 to the position sensor 22. In preferred form, the means 26 and 28 are light conductors, and more specifically fiber optic bundles, these bundles preferably being immediately adjacent or even joined at their outer ends 30.

The transducer further includes a motive means (not shown in FIG. 7) to continuously drive the scanning rotor 18, so that the angle between illumination of the reference sensor 24 and illumination of the position sensor 22 corresponds to the reading of the instrument 12 during that rotation of the rotor.

This reading is preferably transmitted digitally, and in FIG. 7 there is a source 32 of pulsed electrical energy, which energy is transmitted to a usually remote counter 34 having some kind of indicator or display means to show the reading. Of course the reading may be recorded instead of or in addition to being indicated. The transmission of pulses to the counter is controlled by a switching circuit 36, and this is so controlled by the sensors 24 and 22 that pulses are supplied during movement of the rotor between the reference sensor 24 and the mirror 16. Thus the pulse count is proportional to the reading of the instrument.

In preferred form the pulse generator 32 is driven by the same motive means as the scanning rotor 18; or, what amounts to the same thing, is driven by the rotor, as schematically indicated here by the arrow 38, in which case the pulse count is independent of possible variations in the speed of rotation of the rotor, or variations in the pulse rate of the generator 32.

Referring now to FIG. 2 of the drawing, the instrument 42 has a pointer 44 carrying a mirror 46. The transducer comprises a rotor 48 which is coaxial with pointer 44. There is a stationary lamp 50 carried by a fixed part of the housing 52. This illuminates the lower side of a mirror 54 which directs light downward on the axis of the rotor. A stationary light sensor at 56 is located on the common axis, and acts as a position sensor. Another stationary light sensor 58 is located adjacent the path of the mirror 46, and acts as a reference sensor. A part of a fiber optic bundle 60 conveys light from lamp 50 (via mirror 54) to the mirror 46; and another part of the fiber optic bundle 60 conveys reflected light back from mirror 46 to the position sensor 56. The dual bundle 60 is carried by the rotor 48, with the outer ends adjacent one another at 62. A motive means 64 (usually an electric motor) revolves the rotor 48 and so revolves the fiber optic bundle 60 with the outer end 62 moving on a path which follows the path of the mirror 46.

Referring now to FIG. 4, a single fiber optic bundle 60 preferably has coherent fibers, and acts for both transmission and reflection. The parts are preferably concentric. The reflection bundle 66 is preferably the center or core portion, while the annular portion 68 is the transmission portion. Referring now to FIG. 3, the light senor 56 is enclosed or shielded by a can 70 (see also FIG. 4), so that sensor 56 is exposed to the core portion 66, but not to the annular portion 68, nor to light coming from lamp 72. Conversely, the can 70 shields the lamp so that it supplies light to the annular portion 68, but not to the core portion 66. A lense system, not shown, may be located beneath lamp 72. It will be understood that there is no actual division between the core portion 66 and the annular portion 68. The division is solely in how much of the rod 60 is utilized for each purpose. The division need not be a concentric one.

In FIG. 3 the lamp 72 has been placed directly on the rotor axis, as indeed it may be. It will be understood, however, that the downward illumination indicated at 74 may equally well come from a mirror, as shown at 54 in FIG. 2. Except for the location of lamp 72, FIG. 3 may be considered to be an enlargement of FIG. 2 at the sensor 56.

Referring now to FIGS. 1 and 2, the pulse generator includes a rotating element 80 which is driven by the motor 64, or what amounts to the same thing, by the rotor 48, so that the pulse count is independent of the speed of rotation. More specifically, the pulse generator includes a light source (in this case the same lamp 50 but combined with the upwardly reflecting part of the mirror 54), and a light sensor 82, with an apertured disc 80 therebetween. The peripheral portion of disc 80 is apertured, in effect as though radially slotted, as indicated at 84. The axis 86 of the disc is offset from the axis 88 of the rotor, so that the apertured periphery 84 of the disc is on the axis of the rotor, and therefore is in the light path.

Motor 64 drives the rotor by means of a pinion 90 meshing with a gear 92. The latter meshes with a pinion 94 which drives disc 80. A step-up gear ratio is readily provided, which is anyway desirable so that the apertures of the disc need not be made too small.

It will be understood that the disc is not literally apertured or slotted. In practice the disc usually is made by depositing a photoemulsion on a glass or transparent plastic disc. The apertures or radial lines may be drawn initially to large size, and then photographically reduced. The photo image may be exposed, developed, and printed directly on the disc in accordance with known techniques. The number of apertures may be conveniently related to the instrument being scanned, for a direct reading. Thus in the case of a compass, the disc might have three hundred sixty apertures corresponding to 360°, and with a step-up ratio between gear 92 and pinion 94 of ten to one, there would be ten pulses per degree change in compass heading.

In FIG. 2, it will be understood that the lamp 50 could be moved forward into the vertical axis, thus dispensing with the double mirror 54. However, it is convenient to use the arrangement shown, with a double 45° mirror on the axis instead of the lamp; and in this specification, any reference to the lamp being located on the common axis is intended to include the illustrated equivalent arrangement in which the lamp illuminates a mirror which is on the axis, instead of the lamp itself being on the axis.

FIG. 5 shows the present optical scanning transducer combined with a compass having a circular compass card submerged in liquid, as is usual for stabilizing and damping the compass action. In FIG. 5 the compass card 100 is mounted on a main lower pivot which is carried at the upper end of a post 102. The card is confined by a relatively loosely received upper pivot 104, and is immersed in a suitable liquid 106, the latter being sealed in a container 108. The compass card 100 carries an upstanding mirror 110, and ordinarily this is located at "North" on the card. The container 108 is unusual in having an annular transparent portion or window 112 located within the path of mirror 110 and outside the path of the lower outer end of the fiber optic bundle 114.

The remainder of the structure may be the same as that previously described in connection with FIGS. 1 and 2, there being a motor 116 driving a pinion 118 meshing with a gear 120 which turns the rotor 122. Gear 120 drives a pinion, invisible in FIG. 5 but corresponding to pinion 94 in FIG. 1, which rotates the apertured disc 124 of a pulse generator, which as before utilizes a lamp 126, a mirror 128, and a light senor 130. The mirror 128 also transmits light downward around the position sensor 132, to the coherent optic bundle 114. Here again the outer or annular part of the bundle (68 in FIG. 4) transmits light to the mirror, and the center or core portion of the bundle (66 in FIG. 4) guides reflected light back to the position sensor 132. The instrument housing 134 also has a reference sensor 136, which usually would correspond to the heading of the vehicle carrying the instrument.

It will be observed that the mirror 110 is substantial in height, and is curved about the center of the compass card. This has the advantage of accommodating a substantial tilt of the card without affecting the accurracy of the reading. The mirror 110 may be counterbalanced, as is indicated schematically at 138. The compass card may carry a pair of parallel bar magnets, disposed on opposite sides of the post 102, and one of these magnets is here indicated at 140. In most respects the compass may be conventional.

The circuitry may be described with reference to the block diagram shown in FIG. 6. The switching device is preferably a conventional flip-flop circuit indicated at 142. This has two inputs, the input at A coming from the reference sensor, and the input at B coming from the position sensor. The pulse generator is represented by block 144, and its output is supplied to a conventional "and" gate 146. Flip-flop 142 is also connected to "and" gate 146 by means of conductor 148. The remote counter is indicated at 150, and may include numerical display means indicated at 152. The conductor 154 leads to the counter, and may be miles in length without loss of accuracy, because of the digital nature of the transmission. It will be understood that the combination of flip-flop 142 and the "and" gate 146 acts as a switch which supplies a train of pulses to the counter, which train begins with illumination of the reference sensor, and stops with illumination of the position sensor.

Another conductor 156 extends to the counter from terminal A or the reference sensor, and acts as a "reset" means, so that the counter is cleared or re-set to zero for each revolution of the scanner.

The lamp used may be a miniature tungsten filament lamp, or it may be a crystal light source such as gallium arsenide, and in this specification the term "lamp" is intended to be generic to all forms of light source. The light sensor is preferably a phototransistor, but it could also be a photodiode, a photovoltaic cell, or a photoresistance cell.

The instrument need not have a vertical axis as here shown. Indeed, in the case of some instruments, for example, an inclinometer, the axis is horizontal; and in such case, the axis of the scanning rotor is also made horizontal. There may be two such horizontal axes at right angles, as in the case of a combined pitch-and-roll transducer, these instruments all being based on the use of a pendulum-like member.

To summarize, the optical scanning transducer provides the "pick off" for other instruments or transducers such as a compass, an inclinometer, a temperature gauge, or a pressure gauge. The basic principle is the rotation of a light beam (through fiber optics) and the sensing of reflected light (also through fiber optics) at a reference position and at a position which is a function of the input, e.g., compass heading. The scanner and frequency generator are directly coupled and motor-driven. The frequency is sampled from the reference position to the variable position, yielding a number of pulses or a count proportional to the input. These pulses may be read directly on an electronic counter. The frequency generator is selected to provide an output such that thirty-six hundred pulses will correspond to 360°, or ten thousand pulses will correspond to one thousand p.s.i., etc., thereby giving a direct reading of the parameter being measured.

The design is useful for oceanographic use. Only a low DC power is required, and the output signal can be transmitted over many miles of cable. Several parameters may be sampled from the same basic drive, and may yield outputs on separate frequencies for transmission on the same pair of conductors. This approach will fill requirements in the oceanographic field for acoustic buoys, ocean bottom photography, manned research vehicles, current meter buoys, towed vehicles and sleds. Some of the parameters that may be measured are: magnetic heading, pressure depth, tilt roll, tilt pitch, and temperature.

The outputs for the various parameters are pulse counts at fixed frequencies. Pressure depth, tilt roll, tilt pitch, and temperature, may be combined on the same IRIG channel (e.g., 10.5 kc. center frequency) to obtain the maximum amount of information over the minimum number of conductors and channels. The outputs may be synchronized and identified by pulse coding.

It is believed that the construction and operation of my improved digital optical scanning transducer, as well as the advantages thereof, will be apparent from the foregoing detailed description. It will also be apparent that while I have shown and described the invention in several preferred forms, changes may be made without departing from the scope of the invention, as sought to be defined in the following claims. In the claims, the reference to a lamp is not intended to exclude other light sources. Any reference to the lamp being on the rotor axis is not intended to exclude the equivalent use of a lamp-reflecting-mirror on the rotor axis. The reference to the instrument having a pointer is not intended to exclude equivalent instruments in which the scale is moved relative to a fixed pointer, as in the case of the compass card described above. The reference to a counter with display means is not intended to exclude the use of a recorder instead of or in addition to an indicator.

I claim:

1. An optical scanning transducer for use with an instrument having a rotatable pointer carrying a mirror, said transducer comprising a rotor coaxial with the pointer, a lamp on the common axis, a light sensor on the common axis and acting as a position sensor, a light sensor acting as a reference sensor, a light conductor to convey light from the lamp to the mirror, a light conductor to convey reflected light back from the mirror to the position sensor, said light conductors being carried by said rotor with their outer ends adjacent one another, and motive means to revolve the rotor and light conductors with their outer ends on a path which follows the path of the mirror and with their inner ends adjacent the stationary lamp and position sensor, said reference sensor being positioned adjacent said path whereby the angle of rotation between illumination of the reference sensor and illumination of the position sensor corresponds to the reading of the instrument.

2. An optical scanning transducer for use with an instrument having a rotatable pointer carrying a mirror, said transducer comprising a rotor coaxial with the pointer, a lamp on the common axis, a light sensor on the common axis and acting as a position sensor, a light sensor adjacent the path of the mirror and acting as a reference sensor, a light conductor to convey light from the lamp to the mirror, a light conductor to convey reflected light back from the mirror to the position sensor, said light conductors being carried by said rotor with their outer ends adjacent one another, and motive means to revolve the rotor and light conductors with their outer ends on a path which follows the path of the mirror and with their inner ends adjacent the stationary lamp and position sensor, whereby the angle of rotation between illumination of the reference sensor and illumination of the position sensor corresponds to the reading of the instrument, a source of pulsed electrical energy, a counter with display means to count pulses supplied thereto, and a switching circuit between the pulse source and the counter and so controlled by the sensors that pulses are supplied during movement of the light conductors between the reference sensor and the mirror, whereby the pulse count is proportional to the reading of the instrument.

3. An optical scanning transducer for use with an instrument having a rotatable pointer carrying a mirror, said transducer comprising a rotor coaxial with the pointer, a stationary lamp on the common axis, a stationary light sensor on the common axis and acting as a position sensor, a stationary light sensor acting as a reference sensor, a fiber optic bundle to convey light from the lamp to the mirror, a fiber optic bundle to convey reflected light back from the mirror to the position sensor, said bundles being carried by said rotor with their outer ends adjacent one another, and motive means to revolve the rotor and bundles with their outer ends on a path which follows the path of the mirror and with their inner ends adjacent the stationary lamp and position sensor, said reference sensor being positioned adjacent said path whereby the angle of rotation between illumination of the reference sensor and illumination of the position sensor corresponds to the reading of the instrument.

4. An optical scanning transducer for use with an instrument having a rotatable pointer carrying a mirror, said transducer comprising a rotor coaxial with the pointer, a stationary lamp on the common axis, a stationary light sensor on the common axis and acting as a position sensor, a stationary light sensor adjacent the path of the mirror and acting as a reference sensor, a fiber optic bundle to convey light from the lamp to the mirror, a fiber optic bundle to convey reflected light back from the mirror to the position sensor, said bundles being carried by said rotor with their outer ends adjacent one another, and motive means to revolve the rotor and bundles with their outer ends on a path which follows the path of the mirror and with their inner ends adjacent the stationary lamp and position sensor, whereby the angle of rotation between illumination of the reference sensor and illumination of the position sensor corresponds to the reading of the instrument, a source of pulsed electrical energy, a counter with display means to count pulses supplied thereto, and a switching circuit between the pulse source and the counter and so controlled by the sensors that pulses are supplied during movement of the scanning bundles between the reference sensor and the mirror, whereby the pulse count is proportional to the reading of the instrument.

5. A transducer as defined in claim 2, in which the pulse source includes a rotating element driven by the same motive means as the scanning rotor, so that the pulse count is independent of the speed of rotation of the rotor.

6. A transducer as defined in claim 4, in which the pulse source includes a rotating element driven by the same motive means as the scanning rotor, so that the pulse count is independent of the speed of rotation of the rotor.

7. A transducer as defined in claim 2, in which the pulse source includes a light source and a light sensor with an apertured disc therebetween, said apertured disc being driven by the same motive means as the rotor so that the pulse count is independent of the speed of rotation of the rotor.

8. A transducer as defined in claim 4, in which the pulse source includes a light source and a light sensor with an apertured disc therebetween, said apertured disc being driven by the same motive means as the rotor so that the pulse count is independent of the speed of rotation of the rotor.

9. A transducer as defined in claim 2, in which the pulse source includes an apertured disc geared to the scanning rotor so that the pulse count is independent of the speed of rotation of the rotor, the axis of the disc being so offset from the axis of the rotor that the apertured periphery of the disc is on the axis of the rotor, and the aforesaid lamp serving to illuminate the disc as well as the rotor.

10. A transducer as defined in claim 4, in which the pulse source includes an apertured disc geared to the scanning rotor so that the pulse count is independent of the speed of rotation of the rotor, the axis of the disc being so offset from the axis of the rotor that the apertured periphery of the disc is on the axis of the rotor, and the aforesaid lamp serving to illuminate the disc as well as the rotor.

11. A transducer as defined in claim 3, in which a single fiber optic bundle having coherent fibers has a part acting as the transmission bundle and another part acting as the reflection bundle, the position sensor and the lamp being appropriately shielded.

12. A transducer as defined in claim 4, in which a single fiber optic bundle having coherent fibers has a part acting as a transmission bundle and another part acting as the reflection bundle, the said parts being concentric, the position sensor and the lamp being appropriately shielded, the said bundle being curved to change from radial direction at the mirror to axial direction within the rotor.

13. A transducer as defined in claim 3, in which a single fiber optic bundle having coherent fibers acts as both the transmission and reflection bundle, the bundles being concentric, the reflection bundle being the center or core portion, the position sensor being shielded to expose it to the said core portion but not to said lamp, and the lamp being shielded to supply light to the annular portion surrounding the core portion but not to the core portion.

14. A transducer as defined in claim 4, in which a single fiber optic bundle having coherent fibers acts as both the transmission and reflection bundle, the bundles being concentric, the reflection bundle being the center or core portion, the position sensor being shielded to expose it to the said core portion but not to said lamp, and the lamp being shielded to supply light to the annular portion surrounding the core portion but not to the core portion.

15. A transducer as defined in claim 3, in which a single fiber optic bundle having coherent fibers acts as both the transmission and reflection bundle, the bundles being concentric, the reflection bundle being the center or core portion, the position sensor being shielded to expose it to the said core portion but not to said lamp, and the lamp being shielded to supply light to the annular portion surrounding the core portion but not to the core portion, the said bundle being curved to change from radial direction at the mirror to axial direction within the rotor.

16. A transducer as defined in claim 4, in which a single fiber optic bundle having coherent fibers acts as both the transmission and reflection bundle, the bundles being concentric, the reflection bundle being the center or core portion, the position sensor being shielded to expose it to the said core portion but not to said lamp, and the lamp being shielded to supply light to the annular portion surrounding the core portion but not to the core portion, the said bundle being curved to change from radial direction at the mirror to axial direction within the rotor.

17. A transducer as defined in claim 4, in which a single fiber optic bundle having coherent fibers acts as both the transmission and reflection bundle, the bundles being concentric, the reflection bundle being the center or core portion, the position sensor being shielded to expose it to the said core portion but not to said lamp, and the lamp being shielded to supply light to the annular portion surrounding the core portion but not to the core portion, the said bundle being curved to change from radial direction at the mirror to axial direction within the rotor, and in which the pulse source includes an apertured disc geared to the scanning rotor so that the pulse count is independent of the speed of rotation of the rotor, the axis of the disc being so offset from the axis of the rotor that the apertured periphery of the disc is on the axis of the rotor, and the aforesaid lamp serving to illuminate the disc as well as the rotor.

18. An optical scanning transducer as defined in claim 4, structurally combined with an instrument having a rotatable pointer carrying a mirror, the transducer and instrument being fixed in coaxial relation.

19. An optical scanning transducer for use with an instrument having a rotatable pointer carrying a mirror, said transducer comprising a rotor coaxial with the pointer, a lamp, a light sensor acting as a position sensor, a light sensor acting as a reference sensor, said rotor having means to direct light from the lamp to the mirror and means to guide reflected light back from the mirror to the position sensor, motive means to revolve the rotor, said reference sensor being positioned adjacent the path of revolution of said light-directing means whereby the angle of rotation between illumination of the reference sensor and illumination of the position sensor corresponds to the reading of the instrument.

20. An optical scanning transducer for use with an instrument having a rotatable pointer carrying a mirror, said transducer comprising a rotor coaxial with the pointer, a lamp, a light sensor acting as a position sensor, a light sensor acting as a reference sensor, said rotor having means to direct light from the lamp to the mirror and means to guide reflected light back from the mirror to the position sensor, motive means to revolve the rotor, whereby the angle of rotation between illumination of the reference sensor and illumination of the position sensor corresponds to the reading of the instrument, a source of pulsed electrical energy, a counter with display means to count pulses supplied thereto, and a switching circuit between the pulse source and the counter and so controlled by the sensors that pulses are supplied during movement of the rotor between the reference sensor and the mirror, whereby the pulse count is proportional to the reading of the instrument.

21. A transducer as defined in claim 20, in which the pulse source includes a rotating element driven by the same motive means as the scanning rotor, so that the pulse count is independent of the speed of rotation of the rotor.

22. An optical scanning transducer as defined in claim 19, structurally combined with an instrument having a rotatable pointer carrying a mirror, the transducer and instrument being fixed in coaxial relation.

References Cited

UNITED STATES PATENTS

| | | | |
|---|---|---|---|
| 1,988,658 | 1/1935 | Kovalsky | 250—231 X |
| 2,309,117 | 1/1943 | John | 250—227 X |
| 2,525,147 | 10/1950 | Nelson | 250—231 X |
| 3,231,743 | 1/1966 | Potvin | 250—227 X |

ROBERT SEGAL, *Primary Examiner.*